(12) United States Patent
Binzer et al.

(10) Patent No.: US 8,482,454 B2
(45) Date of Patent: Jul. 9, 2013

(54) MONOSTATIC MULTI-BEAM RADAR SENSOR, AS WELL AS METHOD

(75) Inventors: Thomas Binzer, Stuttgart (DE); Dirk Steinbuch, Wimsheim (DE)

(73) Assignee: Robert Bosch GmbH, Stuttgart (DE)

( * ) Notice: Subject to any disclaimer, the term of this patent is extended or adjusted under 35 U.S.C. 154(b) by 320 days.

(21) Appl. No.: 12/734,885

(22) PCT Filed: Oct. 21, 2008

(86) PCT No.: PCT/EP2008/064167
§ 371 (c)(1),
(2), (4) Date: Aug. 13, 2010

(87) PCT Pub. No.: WO2009/077236
PCT Pub. Date: Jun. 25, 2009

(65) Prior Publication Data
US 2011/0032151 A1    Feb. 10, 2011

(30) Foreign Application Priority Data

Dec. 17, 2007   (DE) .......................... 10 2007 060 769

(51) Int. Cl.
*G01S 13/00* (2006.01)
(52) U.S. Cl.
USPC ................. 342/70; 342/82; 342/89; 342/175
(58) Field of Classification Search
USPC .................................. 342/70–72, 82, 89, 175
See application file for complete search history.

(56) References Cited

U.S. PATENT DOCUMENTS

| | | | | |
|---|---|---|---|---|
| 5,181,037 A * | 1/1993 | Komatsu | | 342/70 |
| 5,229,774 A * | 7/1993 | Komatsu | | 342/70 |
| 5,933,109 A * | 8/1999 | Tohya et al. | | 342/175 |
| 5,949,365 A * | 9/1999 | Wagner | | 342/70 |
| 6,037,894 A * | 3/2000 | Pfizenmaier et al. | | 342/70 |
| 6,043,772 A * | 3/2000 | Voigtlaender et al. | | 342/70 |
| 6,097,332 A * | 8/2000 | Crosby, II | | 342/72 |
| 6,127,963 A * | 10/2000 | Schneemann | | 342/70 |
| 6,137,434 A * | 10/2000 | Tohya et al. | | 342/70 |
| 6,215,438 B1 * | 4/2001 | Oswald et al. | | 342/70 |
| 6,462,700 B1 * | 10/2002 | Schmidt et al. | | 342/70 |
| 6,686,867 B1 * | 2/2004 | Lissel et al. | | 342/70 |
| 6,870,500 B2 * | 3/2005 | Suess et al. | | 342/25 F |
| 7,119,733 B2 * | 10/2006 | Schoeberl et al. | | 342/70 |
| 7,145,505 B2 * | 12/2006 | Gottwald et al. | | 342/175 |
| 7,573,420 B2 * | 8/2009 | Forstner et al. | | 342/175 |
| 7,663,533 B2 * | 2/2010 | Toennesen et al. | | 342/70 |
| 7,786,928 B2 * | 8/2010 | Hansen et al. | | 342/175 |
| 2003/0112172 A1 * | 6/2003 | Shinoda et al. | | 342/70 |

(Continued)

FOREIGN PATENT DOCUMENTS

| DE | 196 48 203 | 6/1998 |
|---|---|---|
| DE | 10 2005 062 772 | 7/2007 |

(Continued)

*Primary Examiner* — Jack W Keith
*Assistant Examiner* — Peter Bythrow
(74) *Attorney, Agent, or Firm* — Kenyon & Kenyon LLP

(57) ABSTRACT

A monostatic multi-beam radar sensor includes a group antenna and a mixer system made up of a plurality of transfer mixers connected to antenna elements of the group antenna. A first number of the transfer mixers is switched to isolation mode and a second number of the transfer mixers is switched to transfer mode in order to realize different directional characteristics for the transmit and receive operation.

23 Claims, 1 Drawing Sheet

U.S. PATENT DOCUMENTS

| | | | |
|---|---|---|---|
| 2004/0164891 A1* | 8/2004 | Schoeberl et al. | 342/70 |
| 2005/0156779 A1* | 7/2005 | Wixforth | 342/70 |
| 2005/0285776 A1 | 12/2005 | Miosga et al. | |
| 2006/0114146 A1* | 6/2006 | Lindenmeier et al. | 342/125 |
| 2007/0182619 A1* | 8/2007 | Honda et al. | 342/80 |
| 2008/0297400 A1* | 12/2008 | Hansen et al. | 342/70 |
| 2009/0015476 A1* | 1/2009 | Shibuya et al. | 342/374 |
| 2011/0095937 A1* | 4/2011 | Klar et al. | 342/70 |
| 2011/0267217 A1* | 11/2011 | Hildebrandt et al. | 342/70 |

FOREIGN PATENT DOCUMENTS

| | | |
|---|---|---|
| EP | 1 351 333 | 10/2003 |
| EP | 1 804 074 | 7/2007 |
| JP | 2009-85951 | 4/2009 |
| JP | 2010-536047 | 11/2010 |
| JP | 2011-510278 | 3/2011 |
| WO | WO 2006/029926 | 3/2006 |
| WO | WO 2006029926 A1 * | 3/2006 |

* cited by examiner

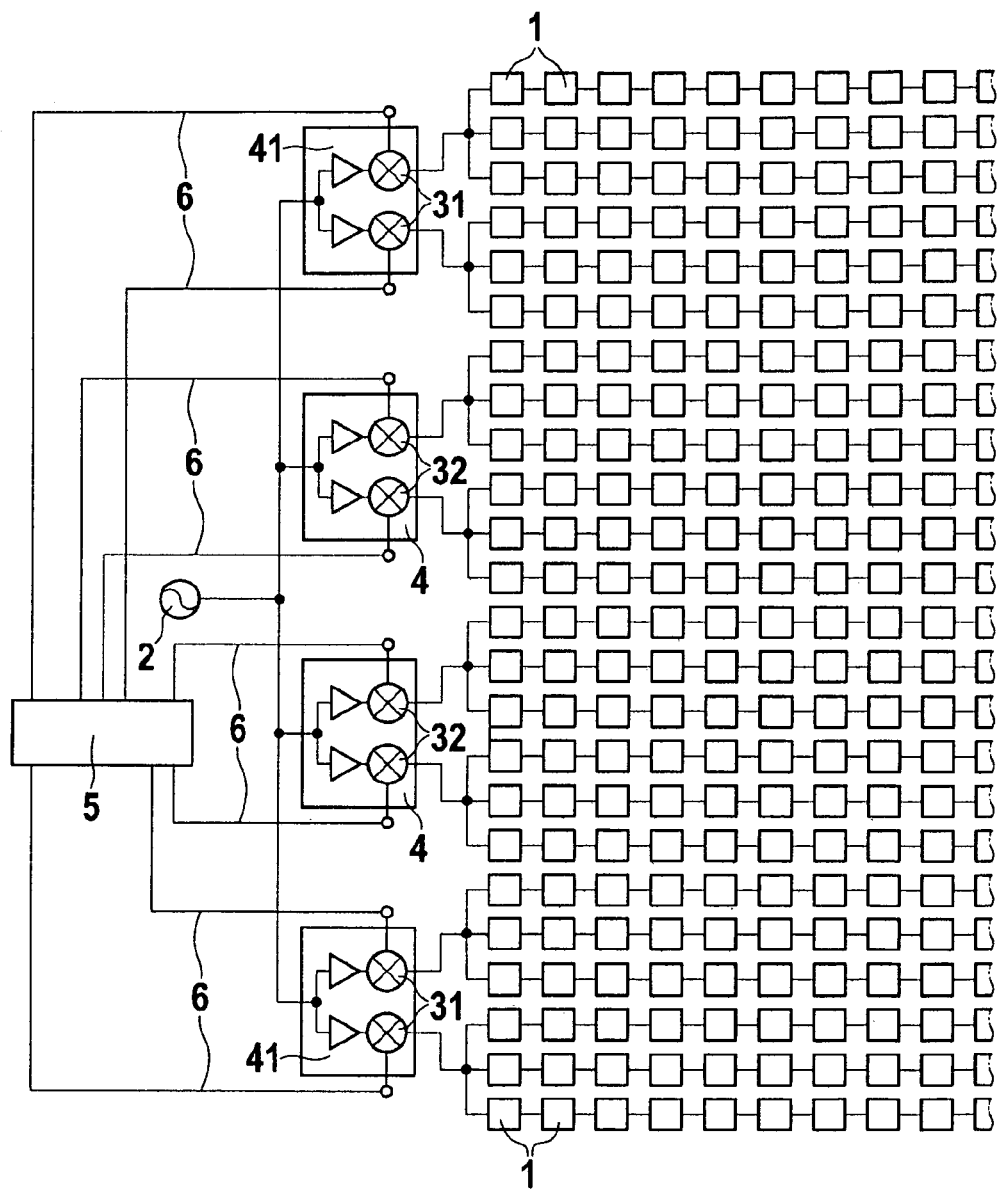

MONOSTATIC MULTI-BEAM RADAR SENSOR, AS WELL AS METHOD

BACKGROUND OF THE INVENTION

1. Field of the Invention

The present invention relates to a monostatic multi-beam radar sensor and a method for operating such a radar sensor.

2. Description of Related Art

A monostatic multi-beam radar sensor for motor vehicles is known from published international patent application WO 2006/029926 A1, the sensor being made up of a group antenna, a planar lens having a plurality of inputs, and a homodyne mixer system having a plurality of transfer mixers, which are connected in parallel to the inputs of the lens. The lens causes beam bundling both in transmit and in receive operation. The use of such a radar sensor enables parallel processing of the signals from a plurality of radar beams. The transfer mixers can be placed in a tight space on one board.

In various applications, e.g., in ACC (adaptive cruise control), the transmit and receive characteristics must differ. This has previously been achieved with the aid of bi-static antenna systems, e.g., in a DBF (digital beam-forming) radar by a transmit antenna having lower bundling and a receive antenna having strong bundling, or by a mixed system, i.e., using one antenna system for transmitting and receiving radar signals, and another antenna system only for receiving radar signals, as described in published German patent document DE 196 48 203 C2.

BRIEF SUMMARY OF THE INVENTION

Using a monostatic multi-beam radar sensor, in which a group antenna is provided and a mixer system made up of a plurality of transfer mixers connected to antenna elements of the group antenna in such a way that a first number of transfer mixers is switched to isolation mode and a second number of the transfer mixers is switched to transfer mode, it is possible to set different directional characteristics for the transmit and receive operation in a monostatic system, i.e., with one shared antenna for transmit and receive operation, while requiring very little space, for instance 50% less antenna area than a bistatic system. The present invention is based on the recognition that transfer mixers switched to isolation mode also supply output signals that are able to be evaluated by phase-correct and amplitude-correct summing in receive operation, so as to achieve digital beam forming (DBF), for instance. In receive operation, the entire antenna aperture is therefore available, and the radiation lobes are correspondingly narrow, which is advantageous for increasing the resolution, especially in lane-relevant regions for LRR (long-range radar). In transmit operation, the full aperture is not available because of the outer, isolating mixers, in particular, and the directional diagram becomes correspondingly broad. The oscillator or transmit signal is able to pass the mixers switched to transfer mode, while it is damped by 25 to 30 dB via the mixers switched to isolation mode and no longer contributes to the directional effect to any significant degree. The aperture is therefore effectively halved, so that the detection range doubles in the transmit case.

In a matrix-type structure of the group antenna it is advantageous to switch the transfer mixers connected to the outer antenna elements to isolation mode.

In order to set up a broader or narrower directional diagram in transmit operation, additional transfer mixers may be set up either for isolation mode or for transfer mode.

It is advantageous to route a plurality of slots of antenna elements of the matrix-type group antenna to one transfer mixer in each case. This saves space for the transfer mixers without restricting the resolution to any considerable extent. Placing two transfer mixers on one chip in each case, both mixers being switched to isolation or transmit mode, also saves surface space and wiring expense.

BRIEF DESCRIPTION OF THE DRAWING

FIG. 1 shows a schematic illustration of an antenna array having connected mixers and a high-frequency source.

DETAILED DESCRIPTION OF THE INVENTION

The present invention according to FIG. 1 provides a matrix-type group antenna having antenna elements 1 for the monostatic operation. A high-frequency source 2 of 77 GHz, for example, is connected to antenna elements 1 via mixers 31, 32. In the exemplary embodiment shown, three slots of antenna elements 1 are combined in each case and connected to a mixer 31 or 32. Mixers 31 or 32 may be implemented as MMICs. Two mixers 31 and 32 are situated together on one chip 4 or 41 in each case. In order to generate a different directivity characteristic for the transmit operation than for the receive operation, the outer two mixers 31 on chip 41 are switched to isolation mode, and the four inner mixers 32 on chip 4 are switched to transfer mode.

In receive operation, an isolating and a transferring mixer both supply identical output signals. If a directivity pattern is produced by digital beam forming (in-phase and amplitude-correct summing of the eight output signals) then the entire antenna aperture is available and the receive diagram is correspondingly narrow. In transmit operation, the full aperture is not available because of the outer, isolating mixers 31, in particular, and the directional diagrams become correspondingly broad. The oscillator or transmit signal of high-frequency source 2 is able to pass transferring mixers 32, while it is damped by 25 to 30 dB via isolating mixers 31 and does not contribute to the directivity movement to any significant degree. The aperture is therefore effectively halved, so that the detection range doubles in transmit operation.

In other developments, additional mixers may be designed either for isolation or transfer mode in order to provide for a broader or narrower directivity diagram in transmit operation.

When using a homodyne mixture, as described in published international patent application WO 2006/029926 A1, for instance, a portion of the signal from high-frequency source 2 generating the signal to be transmitted is diverted and used as local oscillator signal, so that the transmitted signal and the signal from the local oscillator have the same frequency. The intermediate frequency then corresponds to the frequency difference between the local oscillator signal and the received signal and, in a Doppler radar, is a function of the Doppler shift. In an FMCW radar, the frequency of the transmitted signal and thus also the local oscillator frequency is modulated in a ramp-like manner. In this case the intermediate frequency is also a function of the signal propagation time and thus of the distance of the located object, and lies in the order of 0 to a few 100 kHz.

In an evaluation device 5 the mixed various received signals (intermediate frequency signals) of mixers 31 and 32 are time-synchronously sampled (digitized) at their outputs 6 and subjected to known digital beam shaping. Because of the fixed phase and amplitude relation of the individual received signals in azimuth, it is possible to extract both the distance and also the angle information of radar targets.

What is claimed is:

1. A monostatic multi-beam radar sensor, comprising:
a group antenna having multiple antenna elements; and
a mixer system including multiple transfer mixers connected to the antenna elements of the group antenna;
wherein a first subset of the transfer mixers is switched to isolation mode and a second subset of the transfer mixers is switched to transfer mode in order to realize different directional characteristics for a transmit operation and a receive operation.

2. The radar sensor as recited in claim 1, wherein the group antenna has a matrix-type configuration, and wherein transfer mixers connected to outer antenna elements of the group antenna are switched to isolation mode.

3. The radar sensor as recited in claim 1, wherein varying numbers of transfer mixers are switched to one of isolation mode or transfer mode in order to achieve one of a broader or narrower antenna characteristic in the transmit operation.

4. The radar sensor as recited in claim 1, wherein, for the transmit operation, only the transfer mixers switched to transfer mode forward a transmit signal to the group antenna.

5. The radar sensor as recited in claim 1, wherein, for the receive operation, both the transfer mixers switched to transfer mode and the transfer mixers switched to isolation mode supply output signals to an evaluation unit on the receiving side.

6. The radar sensor as recited in claim 5, wherein digital beam shaping is provided on the receiving side.

7. The radar sensor as recited in claim 1, wherein multiple slots of antenna elements of the group antenna are routed to one transfer mixer.

8. The radar sensor as recited in claim 1, wherein two transfer mixers are jointly situated on one chip and are uniformly switched to one of isolation mode or transfer mode.

9. A method for operating a monostatic multi-beam radar sensor having (i) a group antenna including multiple antenna elements and (ii) a mixer system including multiple transfer mixers connected to the antenna elements of the group antenna, comprising:
switching a first subset of the transfer mixers to isolation mode; and
switching a second subset of the transfer mixers to transfer mode;
wherein different directional characteristics are realized for a transmit operation and a receive operation by the switching of the first subset to isolation mode and the switching of the second subset to transfer mode.

10. The method as recited in claim 9, wherein, for the transmit operation, a transmit signal is forwarded to the group antenna only via the transfer mixers switched to transfer mode.

11. The method as recited in claim 9, wherein, for the receive operation, both signals received via the transfer mixers switched to transfer mode and also signals received via the transfer mixers switched to isolation mode are evaluated.

12. The method as recited in claim 9, wherein the transmit signal passes the transfer mixers in the transfer mode.

13. The method as recited in claim 12, wherein the transmit signal is damped by 25 to 30 dB via the mixers in isolation mode and no longer contributes to directional effect.

14. The radar sensor as recited in claim 1, wherein the transmit signal passes the transfer mixers in the transfer mode.

15. The radar sensor as recited in claim 14, wherein the transmit signal is damped by 25 to 30 dB via the mixers in isolation mode and no longer contributes to directional effect.

16. The radar sensor as recited in claim 1, wherein the group antenna has a matrix-type configuration, and wherein transfer mixers connected to outer antenna elements of the group antenna are switched to isolation mode, and wherein, for the transmit operation, only the transfer mixers switched to transfer mode forward a transmit signal to the group antenna.

17. The radar sensor as recited in claim 16, wherein, for the receive operation, both the transfer mixers switched to transfer mode and the transfer mixers switched to isolation mode supply output signals to an evaluation unit on the receiving side, and wherein digital beam shaping is provided on the receiving side.

18. The radar sensor as recited in claim 16, wherein multiple slots of antenna elements of the group antenna are routed to one transfer mixer.

19. The radar sensor as recited in claim 16, wherein two transfer mixers are jointly situated on one chip and are uniformly switched to one of isolation mode or transfer mode.

20. The radar sensor as recited in claim 1, wherein varying numbers of transfer mixers are switched to one of isolation mode or transfer mode to provide one of a broader antenna characteristic or a narrower antenna characteristic in the transmit operation, and wherein, for the transmit operation, only the transfer mixers switched to transfer mode forward a transmit signal to the group antenna.

21. The radar sensor as recited in claim 20, wherein, for the receive operation, both the transfer mixers switched to transfer mode and the transfer mixers switched to isolation mode supply output signals to an evaluation unit on the receiving side, and wherein digital beam shaping is provided on the receiving side.

22. The radar sensor as recited in claim 20, wherein multiple slots of antenna elements of the group antenna are routed to one transfer mixer.

23. The radar sensor as recited in claim 20, wherein two transfer mixers are jointly situated on one chip and are uniformly switched to one of isolation mode or transfer mode.

* * * * *

UNITED STATES PATENT AND TRADEMARK OFFICE
CERTIFICATE OF CORRECTION

PATENT NO.        : 8,482,454 B2                                                      Page 1 of 1
APPLICATION NO. : 12/734885
DATED             : July 9, 2013
INVENTOR(S)       : Binzer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 377 days.

Signed and Sealed this
Eighth Day of September, 2015

Michelle K. Lee
*Director of the United States Patent and Trademark Office*